Sept. 5, 1967  R. W. SPARLING  3,339,434
APPARATUS FOR MONITORING AUTOMATIC MACHINES
Filed Nov. 3, 1964  4 Sheets-Sheet 1

INVENTOR
Russell W. Sparling

BY
Lane, Aitken, Dunner & Ziems
ATTORNEYS

Sept. 5, 1967    R. W. SPARLING    3,339,434
APPARATUS FOR MONITORING AUTOMATIC MACHINES
Filed Nov. 3, 1964    4 Sheets-Sheet 2

INVENTOR
Russell W. Sparling

BY Lane, Aitken, Dunner & Ziems
ATTORNEYS

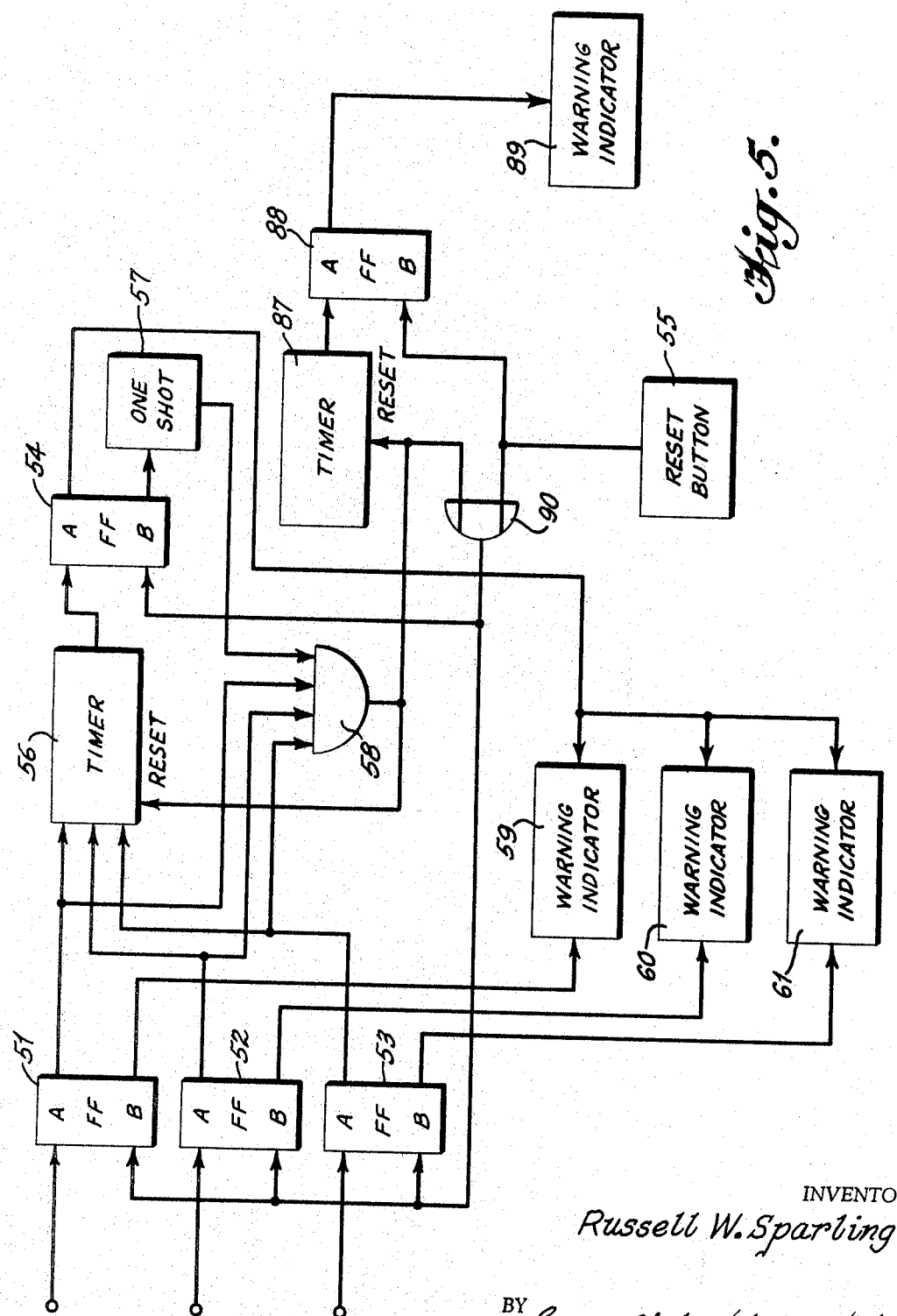

Sept. 5, 1967    R. W. SPARLING    3,339,434
APPARATUS FOR MONITORING AUTOMATIC MACHINES
Filed Nov. 3, 1964    4 Sheets-Sheet 4

INVENTOR
Russell W. Sparling

BY Lane, Aitken, Dunner & Ziems
ATTORNEYS

United States Patent Office 3,339,434
Patented Sept. 5, 1967

3,339,434
APPARATUS FOR MONITORING AUTOMATIC MACHINES
Russell W. Sparling, West Warwick, R.I., assignor to Taco, Inc., Cranston, R.I., a corporation of New York
Filed Nov. 3, 1964, Ser. No. 408,538
16 Claims. (Cl. 77—5)

The present invention relates to apparatus for monitoring repeating cycles of automatic machines, and more particularly to an automatic machine having an electronic timer connected thereto for monitoring the repeating cycles of the machine tool and for producing a control signal whenever the length of time of a particular cycle departs significantly from the length of time of a normal cycle.

Automation has resulted in widespread and increasing use of programmed automatic machines for performing operations on workpieces automatically in continuously repeating cycles. Examples of such machines are packaging machines, bottle capping machines and machine tools for performing drilling, tapping, reaming, broaching, and other operations. In these automated operations, it obviously is important to know immediately when anything goes wrong. When a cutting tool gets dull or breaks, or when the machine jams, a timely warning signal to alert the operator and shut down the machine can avoid production of a large number of defective parts, and in some cases prevent extensive damage to the machine.

In many of these sophisticated automated operations each cycle of operation normally takes the same length of time as long as the machine is operating properly. The present invention takes advantage of this by connecting an electronic timer to the machine to monitor the length of time of each cycle and produce a control or warning signal whenever the time of a particular cycle significantly departs from the time of a normal cycle. A recurring event in each cycle, such as the return of the machine to its starting point, or a cutting tool contacting a workpiece, is utilized to initiate an electrical signal to reset the timer at the same point in each cycle. As long as the cycles repeat themselves in a normal length of time, the timer is reset before it runs out. However, in the event something occurs to alter the cycle, the timer is not reset within the normal time and runs out to produce a control signal to shut down the machine or energize an alarm or warning light.

In one specific embodiment of the invention, as applied to automatic drilling machines, an electric circuit is arranged to be completed each time the drill contacts the workpiece and the signal generated by the completion of this circuit is applied to the timer to reset it. In the event the drill breaks, it will not contact the workpiece at the same point in the next cutting cycle and the timer will run out to produce the control signal indicating that the drill has broken. When this embodiment is employed with a hydraulic or air operated machine tool which exerts a predetermined thrust force for performing the cutting operation, the timer can be utilized to indicate a dull tool, as well as, a broken tool. In this type of machine, the tool takes longer to perform the cutting operation as it gets duller, and when the tool breaks, the machine in effect rapid travels through the entire cutting portion of the cycle so that the length of time of the overall cycle is significantly reduced. The electronic timer is designed to produce a first control signal to indicate a broken tool when the cutting cycle is significantly less than a normal cutting cycle and a second control signal to indicate a dull cutting tool when the cutting cycle is significantly longer than a normal cutting cycle.

In another form of the invention, electric circuitry is associated with the timer for indicating when one or more of a plurality of simultaneously actuated cutting tools breaks. In all forms of the invention the electronic timer, battery and associated circuitry preferably are housed in a separate control box which can be connected electrically to the machine in a simple manner to eliminate complicated interlocking arrangements that might otherwise have to be employed.

Accordingly, it is one object of the invention to provide apparatus for monitoring each cycle of an automatic machine having repeating cycles.

It is another object of the invention to provide a timer which can be electrically connected to an automatic machine in a simple manner to monitor the length of time of each cycle of operation and produce a signal in response to any significant change in the length of time of a cycle.

It is a further object of the invention to provide an electrical system for monitoring each cutting cycle of an automatic machine tool and producing a signal in response to a broken or dull cutting tool which can be used to shut down the machine and energize an alarm or warning light.

It is a still further object of the invention to provide an electrical system for detecting broken cutting tools wherein an electric circuit is completed through the cutting tool at a predetermined point in each cutting cycle and a control signal is produced whenever the electric circuit is not completed at this point.

It is a still further object of the invention to provide apparatus for detecting broken cutting tools wherein the cutting tool and workpiece are connected in an electric circuit which is completed each time the cutting tool contacts the workpiece unless the cutting tool breaks, and wherein the failure to complete the circuit because of a broken cutting tool is utilized to produce a signal to shut down the machine and energize an alarm or warning light.

It is a still further object of the invention to provide an electrical system for detecting one or more broken cutting tools of an automatic machine tool having a plurality of cutting tools wherein each of the cutting tools completes an electrical circuit during each cutting cycle, and a control signal is produced whenever one or more of the cutting tools fails to complete the electrical circuit.

It is a still further object of the invention to provide an electrical system including an electronic timer for detecting a dull cutting tool of an automatic machine tool having repeating cutting cycles wherein the length of time of each cutting cycle is dependent upon the condition of the cutting tool, the length of time of each cycle increasing as the tool becomes duller and significantly decreasing when the tool breaks. When the timer is reset within a predetermined length of time corresponding to that of a normal cutting cycle, no control signal or alarm is produced, but if it is reset at the end of a time interval significantly less than or greater than said predetermined length of time, a control signal is produced to indicate that the tool is broken or dull.

Other objects and features of novelty of the present invention will be specifically pointed out or will otherwise become apparent when referring, for a better understanding of the invention, to the following description taken in conjunction with the accompanying drawings, wherein:

FIG. 5 is a schematic diagram of the electronic timer used in the embodiment of FIG. 4;

Figure 8:
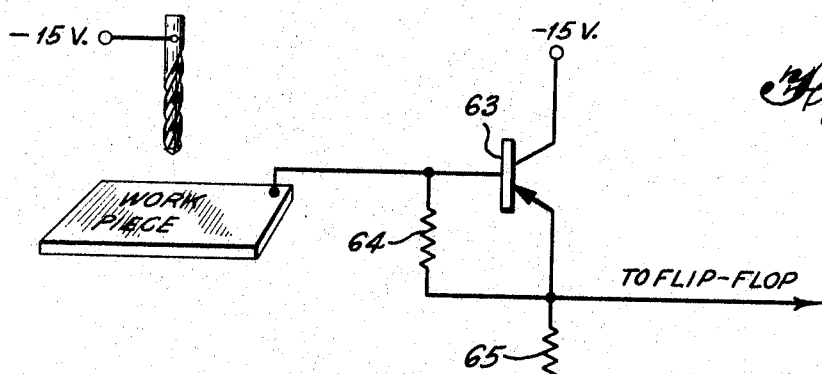
Figure 9:
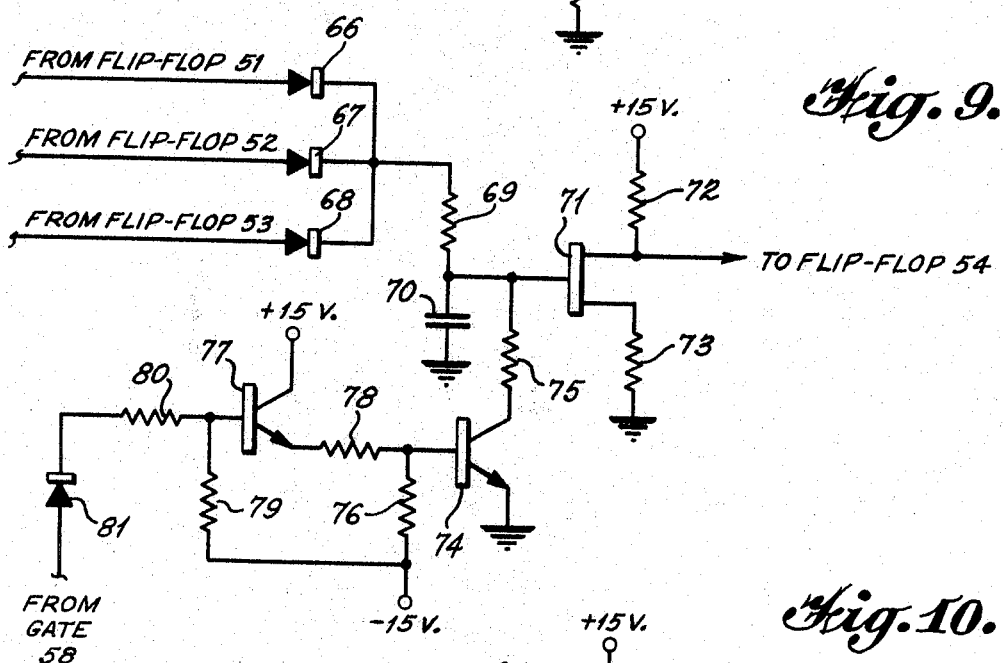

FIG. 8 discloses a circuit for detecting when the drill contacts the workpiece and generating a signal voltage to be applied to one of the flipflops of FIG. 5;

FIG. 9 is a schematic circuit diagram of the timer of FIG. 5; and

Figure 10:
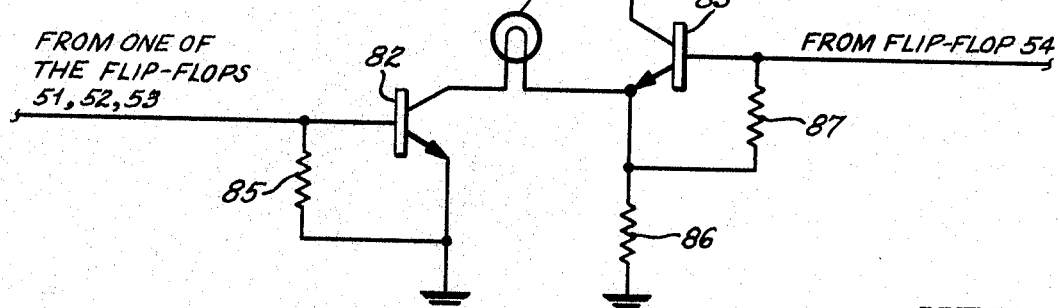

FIG. 10 discloses a circuit for each of the warning indicators of FIG. 5.

Figure 1:
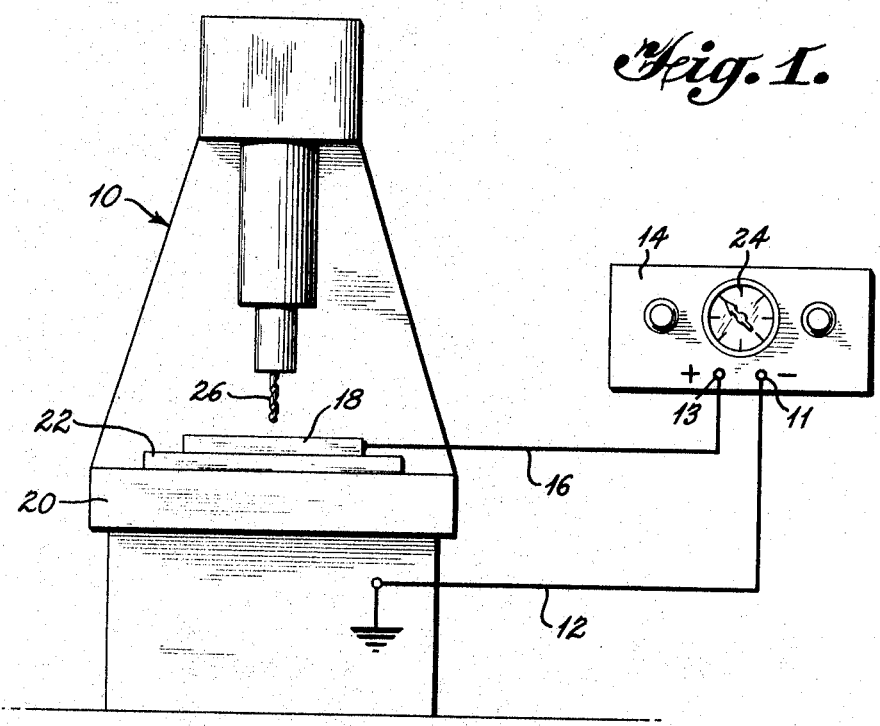
FIG. 1 is a schematic view of a machine tool, specifically a drilling machine, equipped with an electrical detector system embodying features of the invention.

Referring to FIG. 1, one embodiment of the invention is illustrated in connection with an automatic drilling machine 10. However, it is to be understood that the invention is not limited to drilling machines and can be utilized with many different types of automatic machines. The machine 10 is grounded and a wire 12 connects the machine to a ground terminal 11 on an adjustable electronic timer 14. A second wire 16 is connected between a positive terminal 13 on the timer and a workpiece 18 to be drilled which in this case is a printed circuit board. The timer may include a 15 volt battery for providing the necessary potential across the terminals 11 and 13. If the printed circuit board has a circuit pattern formed on one face only, it can rest directly on the worktable surface 20 of the machine. However, if the circuit board is printed on both faces, a layer of insulating material 22 can be positioned between the workpiece and surface 20 to insulate the workpiece from the machine.

The drilling machine 10 is an automatic machine tool with continuously repeating cutting cycles. The length of time of each cutting cycle is substantially constant, and the workpieces are automatically fed to the machine by a conventional feeding mechanism (not shown) as is well known in the art. A dial 24 is provided on the timer so that it can be set to run out after a predetermined time interval slightly longer than the length of time of a normal cutting cycle, and produce a control signal for energizing an alarm, or shutting down the machine, or both. Each time the drill 26 contacts the workpiece to begin the cutting operation, an electrical circuit is completed between the wires 12 and 16 to reset the timer 14 before it runs out so that no control signal is produced. As long as the drill is in good condition, it will contact the workpiece to complete the electrical circuit at the same point in each cutting cycle, and the timer will be reset before it has time to run out, but when the drill breaks it will not contact the workpiece at this point, and the timer will run out to produce the control signal to indicate the drill has broken. It is apparent that the embodiment of FIG. 1 will operate in the same manner regardless of whether blind holes or thru holes are being drilled in the workpiece.

Figure 6:
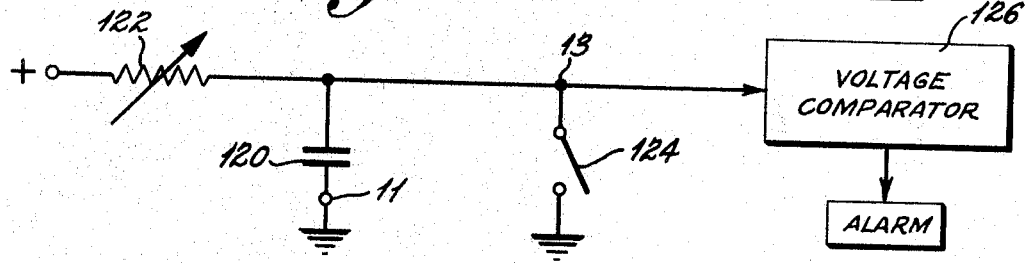
FIG. 6 is a schematic circuit diagram of the control device used in the embodiment of FIG. 1.

Referring to FIG. 6, one type of electronic timer 14 which may be employed in the embodiment of FIG. 1 is illustrated schematically. It comprises a capacitor 120 having one plate connected to the terminal 11 of the timer and then to ground, and the other plate connected to a positive terminal of a battery (not shown) through a variable resistor 122. The other plate of the capacitor 120 is connected directly to the terminal 13 of the electronic timer 14 and the terminal 13 is connected to ground through a normally open switch 124 which schematically represents the switching action provided by the drill 26 and workpiece 18 of FIG. 1. The switch 124 closes when the drill completes the electric circuit to the workpiece and opens when the electrical connection between the drill and the workpiece is interrupted. When the switch 124 closes the capacitor 120 quickly discharges, and when it opens the capacitor is charged at a rate determined by the variable resistor 120. A voltage comparator 126 is connected to the terminal 13 to compare the charge on the capacitor with a standard voltage and produce the aforementioned control signal for actuating an alarm, or the like, whenever the charge on the capacitor exceeds the standard voltage.

As long as the drill is not broken, the switch 124 closes each time the drill contacts the workpiece to discharge the capacitor before the charge exceeds the standard voltage of the voltage comparator. However, when the drill breaks, the switch 124 is not closed before the charge exceeds the standard voltage and the voltage comparator produces the aforementioned control signal. The length of time required for the charge on the capacitor to produce the control signal can be adjusted by the variable resistor 122 so as to be slightly longer than the length of time of a normal cutting cycle.

Figure 2:
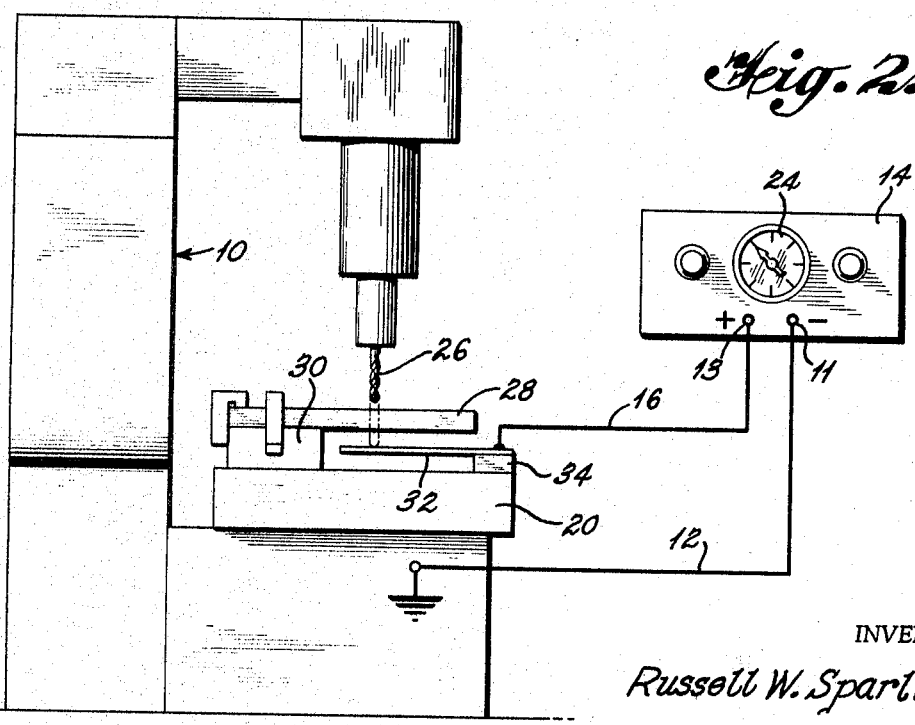
FIG. 2 is a side view of a machine similar to that of FIG. 1 equipped with an electrical detector system illustrating another embodiment of the invention.

Referring to FIG. 2, another embodiment of the invention is illustrated in connection with the drilling machine 10 which eliminates the need for insulating the workpiece from the machine. In this embodiment, a workpiece 28 is mounted on the worktable surface 20 of the machine by a conventional work-holding device 30 which supports the workpiece above the surface 20 so that the drill 26 can pass completely therethrough. The machine is grounded and the wire 12 is connected to the terminal 11 of the timer 14 as before. However, in this embodiment the wire 16 is connected between the terminal 13 and a spring contact finger 32 mounted on the surface 20 of the machine by an insulating block 34 in position to be engaged by the drill 26 after it has drilled through the workpiece 28. Thus the electric circuit between the wires 12 and 16 is completed each time the end of the drill 26 engages the spring contact finger 32 to reset the timer 14. When the drill breaks, the timer is not reset and the control signal is produced to sound an alarm, light a warning light or shut down the machine as previously described.

Figure 3:
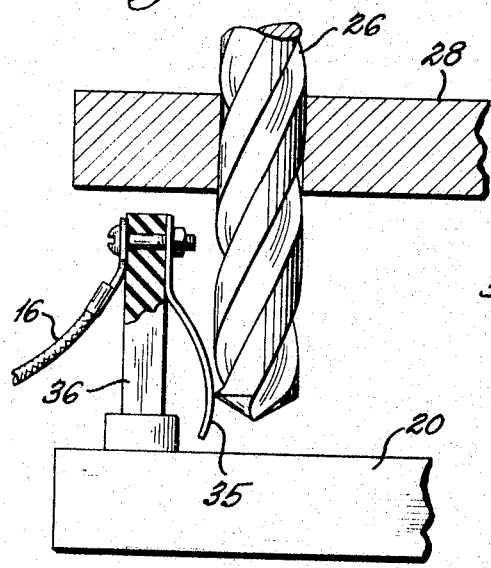
FIG. 3 is an enlarged fragmentary view of a portion of FIG. 2 illustrating a modification of the spring contact finger for completing the circuit to the end of the tool.

Referring to FIG. 3, a modification of the system of FIG. 2 is shown wherein the end of the drill 26 contacts a generally vertically extending spring contact finger 35 mounted on an insulated post 36 projecting above the surface 20 of the machine. The wire 16 is electrically connected to the spring contact finger as before, and the drill engages the contact finger after it passes through the workpiece 28 so that the system operates as described in connection with FIG. 2. However, by positioning the contact finger 35 in a generally vertical position, the contact surface is wiped clean by the end of the drill with each contact, and cutting oils and the like cannot collect on the contact finger.

Figure 4:
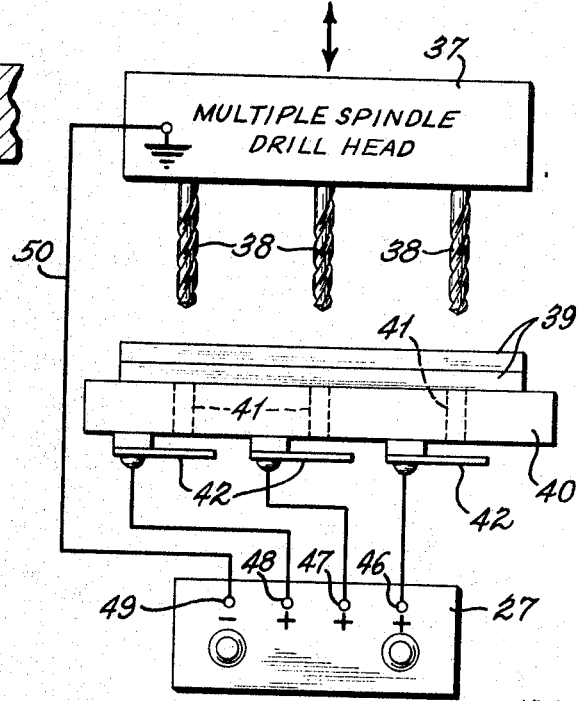
FIG. 4 is a schematic diagram of a multiple spindle drill head illustrating another embodiment of the invention.

Referring to FIG. 4, another embodiment of the invention is illustrated in connection with a multiple spindle drill head 37 having a plurality of drills 38 for drilling a plurality of holes in a workpiece in a single pass. In this embodiment, two workpieces 39 are stacked one on top of the other and supported on a master board 40 having guide holes 41 therein for each of the drills 38. Spring contact fingers 42 are mounted on the master board beneath each of the guide holes 41 and the board is suitably supported above the worktable (not shown) of the drilling machine by insulated blocks if the contact fingers 42 are not otherwise insulated from the master board and machine. Wires connect each of the contact fingers 42 to positive terminals 46-48, respectively, on an electrical control device 27, and a wire 50 connects a ground terminal 49 on the control device to the multiple spindle drill head.

With this arrangement, each of the drills 38 contact the fingers 41 each cutting cycle to complete the circuit between the ground terminal 49 and each of the terminals 46-48. Whenever one or more of the drills breaks, an electrical connection is not made to the contact finger or fingers associated therewith, and the control device produces the control signal for sounding an alarm, lighting a warning light, or shutting down the machine.

Referring to FIG. 5, a schematic diagram of the detector circuit which can be used in the control device 27 is shown.

The detector circuit shown is for a three drill unit. It will be apparent how the circuit can be extended to operate in response to any number of drills. The detector circuit comprises four flipflops 51–54, which can be initially reset to their B state through an OR gate 90 by a reset button 55 so that at the start of operation all of the flipflops 51–54 will be in their B states. When one of the three drills contacts the workpiece, a signal voltage will be applied to the flipflop 51 to set the flipflop 51 in its A state. When a second of the three drills contacts the workpiece, a signal voltage will be applied to the flipflop 52 to set the flipflop 52 in its A state, and when the third of the three drills contacts the workpiece, a signal voltage will be applied to the flipflop 53 to set the flipflop 53 in its A state. When any one of the flipflops 51–53 is set in its A state, it will apply an enabling signal voltage to a timer 56, which in response to receiving this enabling voltage will initiate its timing cycle. The timer 56 will set the flipflop 54 in its A state a predetermined time interval after receiving the first enabling signal voltage from one of the flipflops 51–53. A one-shot multivibrator 57 is connected to the B side of the flipflop 54 so that when the flipflop 54 switches to its A state, the flipflop 54 will apply a negative going signal voltage to the one-shot multivibrator 57. The one-shot multivibrator 57 in response to receiving the negative going signal voltage from the flipflop 54 produces a square wave output pulse, which is applied to a gate 58. The gate 58 is connected to receive enabling signals from each of the flipflops 51–53, each of which will apply an enabling signal voltage to the gate 58 when such flipflop is in its A state. If the gate 58 receives an enabling signal voltage from each of the flipflops 51–53 as a result of these flipflops all being in their A states, the gate 58 will pass the square wave pulse produced by the one-shot multivibrator 57. The square wave pulse, after passing through the enabled gate 58 will be applied through the OR gate 90 to the flipflops 51–54 as well as to the timer 56. The trailing edge of the square wave pulse will reset the flipflops 51–54 to their B states and the square wave pulse will reset the timer 56 back to its initial condition ready for the next cycle. If one of the flipflops 51–53 has not been set to its A state because of a drill being broken or some other malfunction resulting in a drill failing to contact the workpiece, the gate 58 will not be enabled and the square wave pulse produced by the one-shot multivibrator 57 will not pass through the gate 58. Accordingly, the flipflop 54 will remain in its A state, one of the flipflops 51–53 will remain in its B state, and the other two of the flipflops 51–53 will remain in their A states.

Three warning indicators 59, 60 and 61 are connected between the flipflops 54 and the flipflops 51, 52 and 53, respectively. The warning indicator 59 is connected between the B side of the flipflop 51 and the A side of the flipflop 54, the warning indicator 60 is connected between the B side of the flipflop 52 and the A side of the flipflop 54, and the warning indicator 61 is connected between the B side of the flipflop 53 and the A side of the flip 54. The flipflop 54 will apply a positive signal voltage to each of the indicators 59–61 whenever the flipflop 54 is in its A state. The flipflop 51 will apply a positive signal voltage to the indicator 59 whenever the flipflop 51 is in its B state. Similarly, the flipflops 52 and 53 will apply positive signal voltages to the indicators 60 and 61, respectively, whenever the flipflops 52 and 53, respectively, are in their B states. The indicator 59 will energize a signal lamp whenever it receives positive signal voltages from both the flipflops 54 and 51, the indicator 60 will energize a signal lamp whenever it receives positive signal voltages from both the flipflops 54 and 52, and the indicator 61 will energize a signal lamp whenever it receives positive signal voltages from both the flipflops 54 and 53. Accordingly, whenever a drill bit does not contact the workpiece in the normal cycle of operation resulting in the corresponding one of the flipflops 51–53 remaining in its B state while causing the flipflop 54 to remain in its A state, the corresponding one of the indicators 59–61 will energize a lamp to indicate the malfunctioning.

Each pulse passing through the gate 58 also resets another timer 87 which upon being reset immediately initiates its timing cycle. If after a predetermined time interval, the timer 87 has not been reset by the next pulse passing through the gate 58, the timer 87 will set a flipflop 88 in its A state, which will then apply an enabling signal to a warning indicator 89. The flipflop 88 is initially set in its B state by the reset button 55. Upon receiving an enabling signal from the flipflop 88, the warning indicator 89 will energize a signal lamp. Thus the warning indicator 89 will energize its signal lamp whenever a pulse does not pass through the gate 58 within a predetermined time interval after the preceding pulse passes through the gate 58 and accordingly will indicate the failure of any of the drills to contact the workpiece within a predetermined time interval after the drills contacted the workpiece in the preceding cycle.

FIG. 8 discloses the circuit for detecting when the drill bit contacts the workpiece and for generating a signal voltage to be applied to one of the flipflops 51–53 to set the flipflop in its zero state. As shown in FIG. 8 a −15 volt source is connected to the drill bit designated by the reference number 62 and is also connected to the collector of a PNP transistor 63. The base of the transistor 63 is connected to the workpiece and is also connected to the emitter of the transistor 63 through a 4.7 kilohm resistor 64. The emitter of the transistor 63 is connected through a 2.7 kilohm resistor 65 to DC common to which the positive side of the −15 volt source is connected. When the drill bit is not in contact with the workpiece, the transistor 63 will be cut off. When the drill bit comes into contact with the workpiece, the −15 volt source will be applied to the base of the transistor 63 and thus cause the transistor 63 to conduct. This will cause the voltage at the emitter of the transistor 63 to drop and this drop in voltage is applied to one of the flipflops 51–53 to set such flipflop in its A state. A similar circuit is provided for each of the drill bits.

In the circuit for the timer 56, which is shown in FIG. 9, the outputs from the flipflops 51–53 are applied severally through diodes 66, 67 and 68 and then through a resistor 69 to one side of a capacitor 70, the other side of which is connected to DC common. The junction between the capacitor 70 and the resistor 69 is connected to the base of a unijunction transistor 71, one side of which is connected to a source +15 volts through a 2.7 kilohm resistor 72 and the other side of which is connected to DC common through a 47 ohm resistor 73. When one of the flipflops 51–53 is set into its A state, it will apply a positive signal voltage through the corresponding one of the diodes 66–68 to charge the capacitor 70 through the resistor 69. When the voltage on the capacitor 70 reaches a predetermined value it will fire the unijunction transistor 71, which will cause a drop in signal voltage to be applied to the flipflop 54 to set the flipflop 54 in its A state. Thus the flipflop 54 will be set in its A state a predetermined time interval after one of the flipflops 51–53 is set in its A state and this predetermined time interval will depend on the RC time constant provided by the resistor 69 and the capacitor 70.

The junction between the resistor 69 and the capacitor 70 is connected to the collector of an NPN transistor 74 through a 47 ohm resistor 75. The emitter of the transistor 74 is connected to DC common and the base of the transistor 74 is connected to a source of −15 volts through a 22 kilohm resistor 76, and is also connected to the emitter of an NPN transistor 77 through a 1 kilohm resistor 78. The collector of the transistor 77 is connected to the source of +15 volts and the base of the transistor 77 is connected to the source of −15 volts through a 100-kilohm resistor 79 and is also connected to the output of gate 58 through the series circuit of a resistor 80 and a diode 81. The negative side of the +15 volt source and the positive side of the −15 volt source are connected to DC common. When the square wave pulse from the one-shot multivibrator 57 passes through the gate 58 it will pass through the diode 81 and be applied to the base of the transistor 77 causing the transistor 77 to conduct. This action will cause a rise in voltage at the base of the transistor 74 causing the transistor 74 to conduct. Accordingly the capacitor 70 will discharge through the transistor 74. In this manner the timing circuit is reset in response to the output pulse of the one-shot multivibrator 57 passing through the gate 58.

The circuit for the timer 87 is similar to that for the timer 56 except that the capacitor 70 is continuously charged through the resistor 69 from a voltage source instead of from the output of a flipflop, so that the timer 87 initiates its timing cycle immediately upon being reset.

The circuit for each of the warning indicators 59, 60 and 61 is shown in FIG. 10. As shown in this figure, this circuit comprises two NPN transistors 82 and 83 and a signal lamp 84. The base of the transistor 82 is connected to the B side of one of the flipflops 51–53 and the emitter of the transistor 82 is connected to DC common. A 4.7 kilohm resistor 85 connects the base of the transistor 82 to its emitter of the transistor 83, which is also connected to DC common through a 2.7 kilohm resistor 86. The collector of the transistor 83 is connected to a +15 volt source, the opposite side of which is connected to DC common. The base of the transistor 83 is connected to the A side of the flipflop 54. A 4.7 kilohm resistor 87 connects the base and emitter of the transistor 83 together. When the flipflop 54 is in its A state it will render the transistor 83 conductive and when the one of the flipflops 51–53 to which the base of the transistor 82 is connected is in its A state the transistor 82 will be rendered conductive. As a result current will flow from the +15 volt source through the transistor 83, the lamp 84 and the transistor 82 to DC common, thus energizing the lamp 84. Thus the lamp 84 will be energized when the flipflop 54 is in its A state and the corresponding one of the flipflops 51–53 is in its B state. If the flipflop 54 is in its B state, the transistor 83 will be cut off, and if the corresponding one of the flipflops 51–53 is in its B state, the transistor 82 will be cut off and accordingly under either of these conditions the lamp 84 will not be energized.

The circuit for the warning indicator 89 is similar to that for the warning indicator 59–61. In the warning indicator 89 the base of the transistor 83 is connected to the A side of the flipflop 88 so that the transistor 83 is turned on whenever the flipflop 88 is in its A state. The base of the transistor 82 is connected to a positive source of voltage so that the transistor 82 is continuously turned on. Thus the warning indicator 89 will energize its signal lamp whenever the flipflop 88 is in its A state.

In each of the embodiments of FIGS. 1, 2 and 4 an electric circuit is completed by the cutting tool during each cutting cycle and as long as this occurs the control signal is not produced. However, when the tool breaks to alter this pattern, the control signal is produced to indicate that the tool has broken. By taking advantage of the concept of resetting the timer by some recurring event in the cutting cycle, a dull cutting tool also can be detected if the machine tool is of the type which exerts a predetermined thrust force for performing the cutting operation. A typical example of such a machine is a drilling machine having its drilling head advanced and retracted hydraulically. In such a machine the thrust exerted by the drilling head during a cutting operation is determined by the pressure of the hydraulic fluid. If this pressure is maintained substantially constant, the length of time of the cutting cycle remains substantially constant as long as the tool is sharp, but as the tool gets duller, the cutting time increases. This change in cutting time can be utilized to provide an indication that the tool is dull by simply connecting the timer 14 to the machine so that it is reset at the same point each cutting cycle. As long as the tool is sharp, no control signal will be produced, but when the length of time of the cutting cycle increases significantly in response to the extra cutting time required by a dull tool, the timer will run out to produce the control signal as previously described. A convenient and simple way of resetting the timer 14 each cutting cycle would be to mount a limit switch on the machine in position to be actuated each time the drilling head is retracted to its starting position. The limit switch can be connected to the terminals 11 and 13 of the timer to control the resetting thereof.

In the arrangement just described, the length of time of the cutting cycle also will significantly decrease whenever the cutting tool breaks because the resistance to the advancement of the drilling head is almost completely removed. Therefore, by using a timer which can produce a control signal when it is reset at the end of a time interval significantly shorter than the length of a normal cutting cycle, the timer can be used to indicate a broken drill. Of course, a timer also can be used which can produce control signals for time intervals significantly shorter and longer than the length of time of a normal cutting cycle and thus indicate either a broken or a dull drill.

Figure 7:
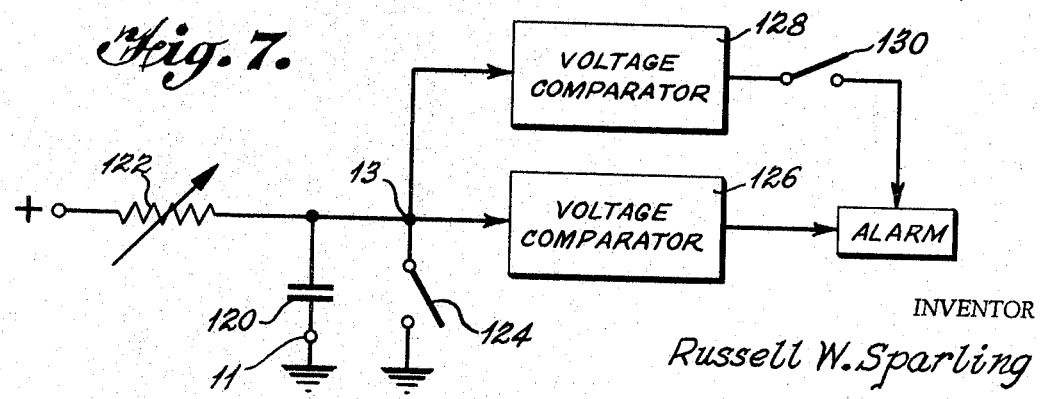
FIG. 7 is a schematic diagram of an electronic timer for producing control signals when reset after time intervals shorter or longer than the length of time of a normal cycle.

Referring to FIG. 7, one type of electronic timer is illustrated schematically which can be employed for producing two signals, one for time intervals significantly shorter and the other for time intervals significantly longer than the length of time of a normal cutting cycle. The capacitor 120, variable resistor 122, switch 124 and voltage comparator 126 as previously described in connection with FIG. 5 are employed to produce a control signal for energizing an alarm when the cutting cycle time increases sufficiently to enable the charge on the capacitor 120 to exceed the standard voltage of the voltage comparator 126. In this embodiment, the switch 124 represents schematically the limit switch which is actuated each time the drilling head retracts to its starting position, as mentioned above.

A second voltage comparator 128 is provided for energizing the alarm through a normally open switch 130 which closes and opens with the switch 124. The voltage comparator 128 compares the charge on the capacitor 120 with a standard voltage significantly lower than that of the voltage comparator 126, and continuously produces an output signal until the charge on the capacitor exceeds its standard voltage. As long as the cutting tool is not broken, the switch 130 closes after the charge on the capacitor has exceeded the standard voltage of the second voltage comparator 128, and therefore, no signal will be applied to energize the alarm. However, in the event the drill breaks, the cutting cycle time decreases significantly and the switch 130 closes before the charge on the capacitor exceeds the standard voltage of the voltage comparator 128, and the output signal of the voltage comparator is applied to the alarm to indicate that the drill is broken.

The charging of the capacitor 120 preferably should be linear. However, most capacitors will accumulate the initial part of their total charge linearly. Therefore if the capacitor 120 is large enough so that only the initial portion of its capacity is used, the charging will be substantially linear.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In combination, an automatic machine having elements movable in continuously repeating cycles for performing operations on workpieces with the length of time of each cycle being substantially constant as long as the machine is operating properly, means for producing an electric signal each time one of said elements of said machine reaches a predetermined point in each cycle of operation, resettable electric timer means for producing a control signal whenever it is not reset at the end of a time interval corresponding to the normal length of time of one of said cycles, and means for applying said electric signal to said timer to reset the timer each cycle of operation.

2. The invention as recited in claim 1 wherein said automatic machine is a machine tool performing cutting operations on workpieces, and wherein the length of time of the cutting cycles is significantly reduced when the cutting tool breaks, said timer means producing said control signal whenever it is reset at the end of a time interval significantly less than the length of time of a normal cutting cycle.

3. The invention as recited in claim 1, wherein said automatic machine is a machine tool for performing cutting operations on workpieces and wherein the length of time of the cutting cycles increases as the cutting tool gets duller, said timer means producing said control signal whenever it is reset at the end of a time interval significantly greater than the length of time of a normal cutting cycle.

4. The invention as defined in claim 1 wherein said automatic machine is a machine tool having a cutting cycle with a length of time which is substantially constant regardless of the condition of the cutting tool thereof, and wherein said timer means produces a control signal whenever it is not reset within a length of time corresponding to the length of time of said cutting cycle.

5. In combination, an automatic machine tool performing repeating cutting cycles on workpieces delivered serially to the machine, each of said cycles normally taking a predetermined length of time for a good cutting tool and a significantly longer time for a dull cutting tool and a significantly shorter time when the cutting tool breaks, means for producing an electrical signal each time said machine reaches a predetermined point in each cutting cycle, resettable electric timer means, and means for applying said electric signal to said timer means to reset it each time the signal is produced, said timer means producing a control signal whenever it is reset at the end of a time interval significantly less than or greater than the predetermined length of time of a normal cutting cycle.

6. In combination, an automatic machine tool performing repeating cutting cycles on workpieces delivered serially to the machine, resettable electric timer means, and means for electrically connecting said timer to said machine tool and the workpiece being operated upon in a manner to produce an electric signal each time the cutting tool contacts the workpiece and reset the timer each time said electric signal is produced, said timer producing a control signal indicative of a defective tool whenever it is not reset within a length of time corresponding to the length of time of a normal cutting cycle.

7. The invention as recited in claim 6 wherein said machine tool is grounded and said workpieces are electrically isolated from the machine tool whereby an electric circuit is completed each time the cutting tool contacts the workpiece to generate said electric signal.

8. In combination, an automatic machine tool performing repeating cutting cycles upon workpieces serially delivered to the machine, electric contact means mounted on said machine tool and electrically isolated therefrom, said contact means being mounted in position to be contacted by the cutting tool of said machine tool after it has performed its operation upon a workpiece, resettable electric timer means for producing a control signal whenever it is not reset within a length of time corresponding to a normal cutting cycle, and electric circuit means connecting said timer means to said machine tool and contact means for resetting the timer means each time the cutting tool contacts said contact means.

9. The invention as defined in claim 8 wherein said electric contact means includes a resilient blade contact having a portion thereof positioned to be contacted by the cutting tool, said portion extending at an acute angle to the line of movement of the cutting tool to produce a wiping contact action.

10. In combination, an automatic machine tool having a plurality of cutting tools simultaneously performing cutting operations in automatically repeating cutting cycles, electrical contact means electrically insulated from said machine tool and positioned to be contacted by each of said cutting tools at a predetermined point in its cutting cycle, means for connecting said machine to ground and each of said electrical contact means to a source of potential to produce separate electric signals each when a particular cutting tool makes contact with said electric contact means, and detector circuit means responsive to said electric signals for producing a control signal whenever one or more of said cutting tools fails to make contact with said electric contact means.

11. In combination, an automatic machine tool having a plurality of cutting tools simultaneously performing cutting operations in automatically repeating cutting cycles, electrical contact means positioned to be contacted by each of said cutting tools at a predetermined point in its cutting cycle to produce an electric signal indicating when each cutting tool makes contact therewith, and detector means responsive to said electric signals for producing a control signal whenever one or more of said cutting tools fails to make contact with said electric contact means, said detector means including resettable electric timer means which is reset by one of said electric signals each cutting cycle and which produces a second control signal whenever it is not reset within a length of time corresponding to the length of time of a normal cutting cycle.

12. A method for detecting a defective cutting tool of an automatic machine tool having repeating cutting cycles, which includes the steps of, performing the cutting operation with a predetermined thrust force so that the cutting cycle normally takes a predetermined length of time for a good cutting tool and takes more time as the cutting tool becomes duller and significantly less time when the cutting tool breaks, resetting a timer each cutting cycle at a predetermined point in the cutting cycle, and producing a control signal whenever the timer is reset at the end of a time interval significantly less or greater than said predetermined length of time.

13. A method for detecting a broken cutting tool of an automatic machine tool having repeating cutting cycles, which includes the steps of, contacting the cutting end of the cutting tool at a predetermined point in each cutting cycle, timing the time lapse between successive contacts with the cutting end of the cutting tool, and producing a control signal indicative of a defective tool whenever the lapse of time between successive contacts varies significantly from the normal length of time of each of said cutting cycles.

14. A method for detecting broken cutting tools of an automatic machine tool having a plurality of cutting tools and repeating cutting cycles, which includes the steps, completing a separate electrical circuit to the cutting end of each of said cutting tools at a predetermined point in each of said cutting cycles, and producing a control signal indicative of a broken tool whenever one or more of said cutting tools fails to complete its separate electrical circuit at said point in each cutting cycle.

15. In combination, an automatic machine having elements movable in continuously repeating cycles for performing operations on workpiece elements delivered serially to and from the machine during each of said cycles, the length of time of each cycle being substantially constant as long as the machine is operating properly, means for producing a signal each time one of said elements reaches a predetermined point in each cycle of operation, resettable timer means for producing a control signal whenever it is not reset at the end of a time interval corresponding to the normal length of time of one of said cycles, and means for applying said signal to said timer to reset the timer each cycle of operation.

16. In combination, an automatic machine having elements movable in continuously repeating cycles for performing operations on workpieces with the length of time of each cycle being substantially constant as long as the machine is operating properly, means for producing a signal each time one of said elements of said machine reaches a predetermined point in each cycle of operation, resettable timer means for producing a control signal whenever it is not reset at the end of a time interval corresponding to the normal length of time of one of said cycles, and means for applying said signal to said timer to reset the timer each cycle of operation.

References Cited

UNITED STATES PATENTS

| | | | |
|---|---|---|---|
| 1,935,979 | 11/1933 | Hubbard | 77—5.2 |
| 2,218,872 | 10/1940 | Carris | 77—5.2 |
| 2,738,008 | 3/1956 | Heyman | 83—62 |
| 2,920,508 | 1/1960 | Wennerberg | 77—5.2 |

FRANCIS S. HUSAR, *Primary Examiner.*